US012452308B2

(12) United States Patent
Arora et al.

(10) Patent No.: US 12,452,308 B2
(45) Date of Patent: Oct. 21, 2025

(54) SYSTEMS, METHODS, AND APPARATUSES FOR DETECTING AND PREVENTING MISAPPROPRIATION ATTEMPTS BASED ON INITIATOR DEVICE DATA AND DYNAMIC RULES IN A DISTRIBUTED NETWORK

(71) Applicant: BANK OF AMERICA CORPORATION, Charlotte, NC (US)

(72) Inventors: Saurabh Arora, Gurugram (IN); Sandeep Kumar Chauhan, Miyapur Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 369 days.

(21) Appl. No.: 18/140,064

(22) Filed: Apr. 27, 2023

(65) Prior Publication Data
US 2024/0364741 A1 Oct. 31, 2024

(51) Int. Cl.
*H04L 9/40* (2022.01)
*H04L 47/78* (2022.01)

(52) U.S. Cl.
CPC ............ *H04L 63/20* (2013.01); *H04L 47/781* (2013.01); *H04L 63/0236* (2013.01)

(58) Field of Classification Search
CPC .... H04L 63/20; H04L 47/781; H04L 63/0236
See application file for complete search history.

(56) References Cited

U.S. PATENT DOCUMENTS

| | | | |
|---|---|---|---|
| 6,601,048 B1 | 7/2003 | Gavan | |
| 7,403,922 B1 | 7/2008 | Lewis | |
| 7,853,533 B2 | 12/2010 | Eisen | |
| 9,858,575 B2 | 1/2018 | Meredith | |
| 10,290,053 B2 | 5/2019 | Priess | |
| 11,080,720 B2 | 8/2021 | Miltonberger | |
| 11,410,179 B2 | 8/2022 | Eisen | |

(Continued)

FOREIGN PATENT DOCUMENTS

| | | |
|---|---|---|
| CN | 101375546 B | 9/2012 |
| EP | 1897051 B1 | 7/2019 |

(Continued)

*Primary Examiner* — Sm A Rahman
(74) *Attorney, Agent, or Firm* — Moore & Van Allen PLLC; Lauren M. Stokes

(57) ABSTRACT

Systems, computer program products, and methods are described herein for detecting and preventing misappropriation attempts based on initiator device data and dynamic rules. The present disclosure is configured to identify a current resource transmission request from an initiator device; generate a resource transmission category type for the current resource transmission request; identify initiator device data associated with the initiator device; generate a distributed ledger associated with the initiator device; identify at least one smart contract associated with the distributed ledger; generate, based on the at least one smart contract, a dynamic resource transmission rule tree; update the current resource transmission request node with at least one of an acceptable indicator or a hold indicator based on the at least one resource transmission category; and allow, in an instance where the current resource transmission request node comprises the acceptable indicator, the current resource transmission request.

19 Claims, 8 Drawing Sheets

(56) References Cited

U.S. PATENT DOCUMENTS

| | | |
|---|---|---|
| 11,606,370 B1 | 3/2023 | Comeaux |
| 11,657,299 B1 | 5/2023 | Yalov |
| 11,669,844 B1 | 6/2023 | Comeaux |
| 11,683,326 B2 | 6/2023 | Eisen |
| 2003/0147516 A1 | 8/2003 | Lawyer |
| 2008/0184355 A1 | 7/2008 | Walrath |
| 2010/0094767 A1 | 4/2010 | Miltonberger |
| 2012/0240185 A1* | 9/2012 | Kapoor ............... H04L 41/0866 726/1 |
| 2015/0073981 A1 | 3/2015 | Adjaoute |
| 2017/0029525 A1 | 2/2017 | Zang |
| 2022/0172208 A1* | 6/2022 | Cella ...................... G06N 3/006 |

FOREIGN PATENT DOCUMENTS

| | | |
|---|---|---|
| GB | 2303275 B | 6/1997 |
| JP | 4827034 B2 | 11/2011 |

* cited by examiner

SYSTEMS, METHODS, AND APPARATUSES FOR DETECTING AND PREVENTING MISAPPROPRIATION ATTEMPTS BASED ON INITIATOR DEVICE DATA AND DYNAMIC RULES IN A DISTRIBUTED NETWORK

TECHNOLOGICAL FIELD

Example embodiments of the present disclosure relate to detecting and preventing misappropriation attempts based on initiator device data and dynamic rules in a distributed network.

BACKGROUND

Managers of an electronic network, including a distributed network, may have a harder time than ever determining when a newly used device is associated with previous misappropriation attempts. This is especially true where the security of data for these misappropriation attempts and for non-misappropriation attempts must to be protected. Similarly, there further exists a need for misappropriation attempts for electronic resources to be determined in an efficient, accurate, and secure manner.

Applicant has identified a number of deficiencies and problems associated with detecting and preventing misappropriation attempts based on initiator device data and dynamic rules in a distributed network. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for detecting and preventing misappropriation attempts based on initiator device data and dynamic rules in a distributed network.

In one aspect, a system for detecting and preventing misappropriation attempts based on initiator device data and dynamic rules is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to perform the following operations: identify a current resource transmission request from an initiator device; generate a resource transmission category type for the current resource transmission request; identify initiator device data associated with the initiator device, wherein the initiator device data comprises an initiator device identifier; generate a distributed ledger associated with the initiator device, wherein the distributed ledger comprises the current resource transmission request; identify at least one smart contract associated with the distributed ledger, wherein the at least one smart contract comprises at least one resource transmission category; generate, based on the at least one smart contract, a dynamic resource transmission rule tree, wherein the dynamic resource transmission rule tree comprises a current resource transmission request node associated with the current resource transmission request; update the current resource transmission request node with at least one of an acceptable indicator or a hold indicator based on the at least one resource transmission category; and allow, in an instance where the current resource transmission request node comprises the acceptable indicator, the current resource transmission request.

In some embodiments, the generation of the distributed ledger associated with the initiator device identifier causes the at least one processing device to perform the following operation: wherein, in an instance where the distributed ledger associated with the initiator device identifier exists, update the distributed ledger with the current resource transmission request, or wherein, in an instance where the distributed ledger associated with the initiator device identifier does not exist, generate the distributed ledger with the current resource transmission request.

In some embodiments, wherein executing the computer-readable code is configured to cause the at least one processing device to perform the following operation to temporarily block, in an instance where the current resource transmission request node comprises the hold indicator, the current resource transmission request. In some embodiments, the computer-readable code is configured to cause the at least one processing device to perform the following operations: transmit, in response to the temporary block, the dynamic resource transmission rule tree to a resource entity device, wherein the resource entity device is associated with the current resource transmission request; receive a review indication for the current resource transmission request; and determine, based on the review indication, whether to allow the current resource transmission request, wherein, in an instance where the review indication comprises a misappropriation attempt indication, block the current resource transmission request, or wherein, in an instance where the review indication comprises a non-misappropriation attempt indication, allow the current resource transmission request; and generate an updated dynamic resource transmission rule tree comprising the current resource transmission request node and the review indication. In some embodiments, the temporary block comprises a pre-determined period.

In some embodiments, the computer-readable code is configured to cause the at least one processing device to perform the following operation to generate, based on the at least one smart contract, the dynamic resource transmission rule tree, wherein the dynamic resource transmission rule tree comprises at least one previous resource transmission request node associated with the initiator device identifier, and wherein the at least one previous resource transmission request node comprises at least one of the acceptable indicator or the hold indicator.

In some embodiments, the computer-readable code is configured to cause the at least one processing device to perform the following operation transmit at least one of the dynamic resource transmission rule tree or the updated dynamic resource transmission rule tree to the initiator device.

In some embodiments, the computer-readable code is configured to cause the at least one processing device to perform the following operations to: upload, by the initiator device, at least one of the dynamic resource transmission rule tree or the updated dynamic resource transmission rule tree; identify a new resource transmission request of the initiator device; generate a new resource transmission category type for the new resource transmission request; and determine, based on the at least one of the dynamic resource transmission rule tree or the updated dynamic resource transmission rule tree, whether to block the new resource transmission request, wherein, in an instance where at least one of the dynamic resource transmission rule tree or the updated dynamic resource transmission rule tree comprises at least one hold indicator associated with the new resource transmission category type, block the new resource transmission request.

In some embodiments, the at least one smart contract is associated with at least one resource transmission entity, and wherein the at least one smart contract comprises a plurality of resource transmission categories.

In another aspect, a computer program product for detecting and preventing misappropriation attempts based on initiator device data and dynamic rules is provided. In some embodiments, the computer program product may comprise at least one non-transitory computer-readable medium having computer-readable program code portions embodied therein, the computer-readable program code portions which when executed by a processing device are configured to cause the processor to perform the following operations: identify a current resource transmission request from an initiator device; generate a resource transmission category type for the current resource transmission request; identify initiator device data associated with the initiator device, wherein the initiator device data comprises an initiator device identifier; generate a distributed ledger associated with the initiator device, wherein the distributed ledger comprises the current resource transmission request; identify at least one smart contract associated with the distributed ledger, wherein the at least one smart contract comprises at least one resource transmission category; generate, based on the at least one smart contract, a dynamic resource transmission rule tree, wherein the dynamic resource transmission rule tree comprises a current resource transmission request node associated with the current resource transmission request; update the current resource transmission request node with at least one of an acceptable indicator or a hold indicator based on the at least one resource transmission category; and allow, in an instance where the current resource transmission request node comprises the acceptable indicator, the current resource transmission request.

In some embodiments, the processing device may be configured to cause the processor to perform the following operation temporarily block, in an instance where the current resource transmission request node comprises the hold indicator, the current resource transmission request.

In some embodiments, the processing device may be configured to cause the processor to perform the following operations: transmit, in response to the temporary block, the dynamic resource transmission rule tree to a resource entity device, wherein the resource entity device is associated with the current resource transmission request; receive a review indication for the current resource transmission request; and allow, based on the review indication, the current resource transmission request, wherein, in an instance where the review indication comprises a misappropriation attempt indication, block the current resource transmission request, or wherein, in an instance where the review indication comprises a non-misappropriation attempt indication, allow the current resource transmission request; and generate an updated dynamic resource transmission rule tree comprising the current resource transmission request node and the review indication.

In some embodiments, the processing device may be configured to cause the processor to perform the following operation generate, based on the at least one smart contract, the dynamic resource transmission rule tree, wherein the dynamic resource transmission rule tree comprises at least one previous resource transmission request node associated with the initiator device identifier, and wherein the at least one previous resource transmission request node comprises at least one of the acceptable indicator or the hold indicator.

In some embodiments, the processing device may be configured to cause the processor to perform the following operation transmit at least one of the dynamic resource transmission rule tree or the updated dynamic resource transmission rule tree to the initiator device.

In some embodiments, the processing device may be configured to cause the processor to perform the following operations: upload, by the initiator device, at least one of the dynamic resource transmission rule tree or the updated dynamic resource transmission rule tree; identify a new resource transmission request of the initiator device; generate a new resource transmission category type for the new resource transmission request; and determine, based on the at least one of the dynamic resource transmission rule tree or the updated dynamic resource transmission rule tree, whether to block the new resource transmission request, wherein, in an instance where at least one of the dynamic resource transmission rule tree or the updated dynamic resource transmission rule tree comprises at least one hold indicator associated with the new resource transmission category type, block the new resource transmission request.

In another aspect, a computer-implemented method for detecting and preventing misappropriation attempts based on initiator device data and dynamic rules is provided. In some embodiments, the computer implemented method comprising: identifying a current resource transmission request from an initiator device; generating a resource transmission category type for the current resource transmission request; identifying initiator device data associated with the initiator device, wherein the initiator device data comprises an initiator device identifier; generating a distributed ledger associated with the initiator device, wherein the distributed ledger comprises the current resource transmission request; identifying at least one smart contract associated with the distributed ledger, wherein the at least one smart contract comprises at least one resource transmission category; generating, based on the at least one smart contract, a dynamic resource transmission rule tree, wherein the dynamic resource transmission rule tree comprises a current resource transmission request node associated with the current resource transmission request; updating the current resource transmission request node with at least one of an acceptable indicator or a hold indicator based on the at least one resource transmission category; and allowing, in an instance where the current resource transmission request node comprises the acceptable indicator, the current resource transmission request.

In some embodiments, the computer-implemented method may further comprise temporarily blocking, in an instance where the current resource transmission request node comprises the hold indicator, the current resource transmission request.

In some embodiments, the computer-implemented method may further comprise: transmitting, in response to the temporary block, the dynamic resource transmission rule tree to a resource entity device, wherein the resource entity device is associated with the current resource transmission request; receiving a review indication for the current resource transmission request; and allowing, based on the review indication, the current resource transmission request, wherein, in an instance where the review indication comprises a misappropriation attempt indication, blocking the current resource transmission request, or wherein, in an instance where the review indication comprises a non-misappropriation attempt indication, allowing the current resource transmission request; and generating an updated dynamic resource transmission rule tree comprising the current resource transmission request node and the review indication.

In some embodiments, the computer-implemented method may further comprise generating, based on the at least one smart contract, the dynamic resource transmission rule tree, wherein the dynamic resource transmission rule tree comprises at least one previous resource transmission request node associated with the initiator device identifier, and wherein the at least one previous resource transmission request node comprises at least one of the acceptable indicator or the hold indicator.

In some embodiments, the computer-implemented method may further comprise transmitting at least one of the dynamic resource transmission rule tree or the updated dynamic resource transmission rule tree to the initiator device. m The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
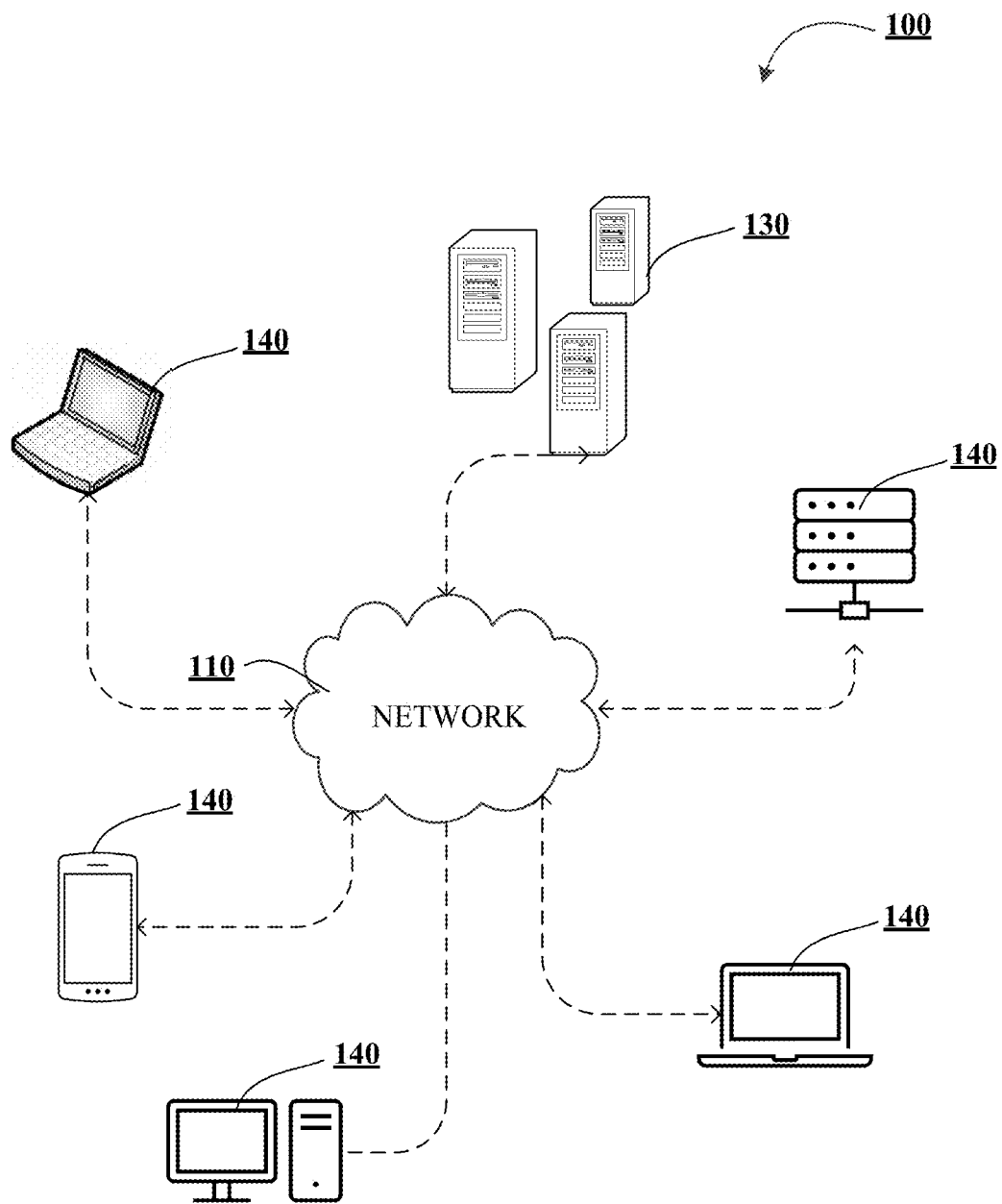
Figure 1B:
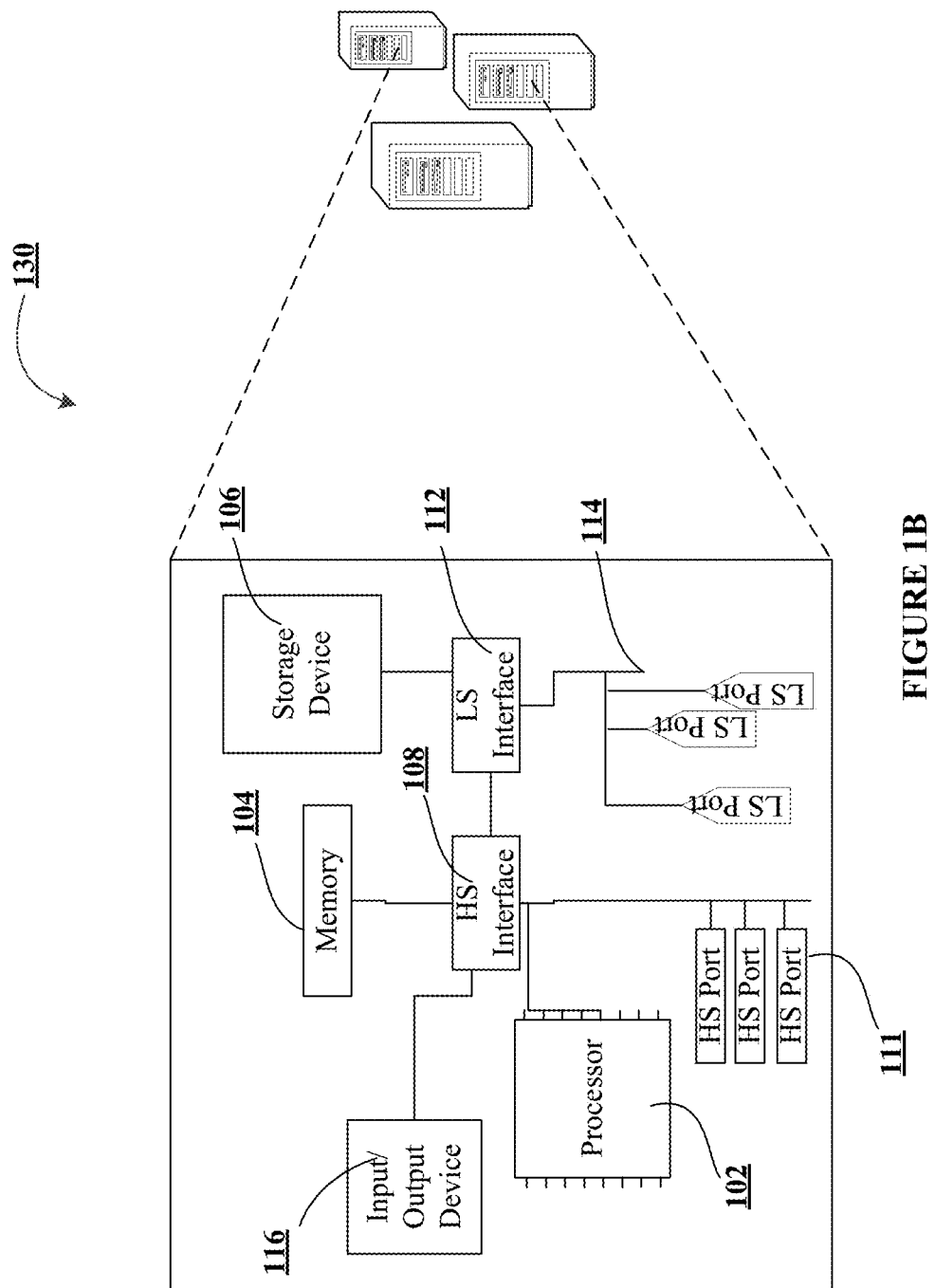
Figure 1C:
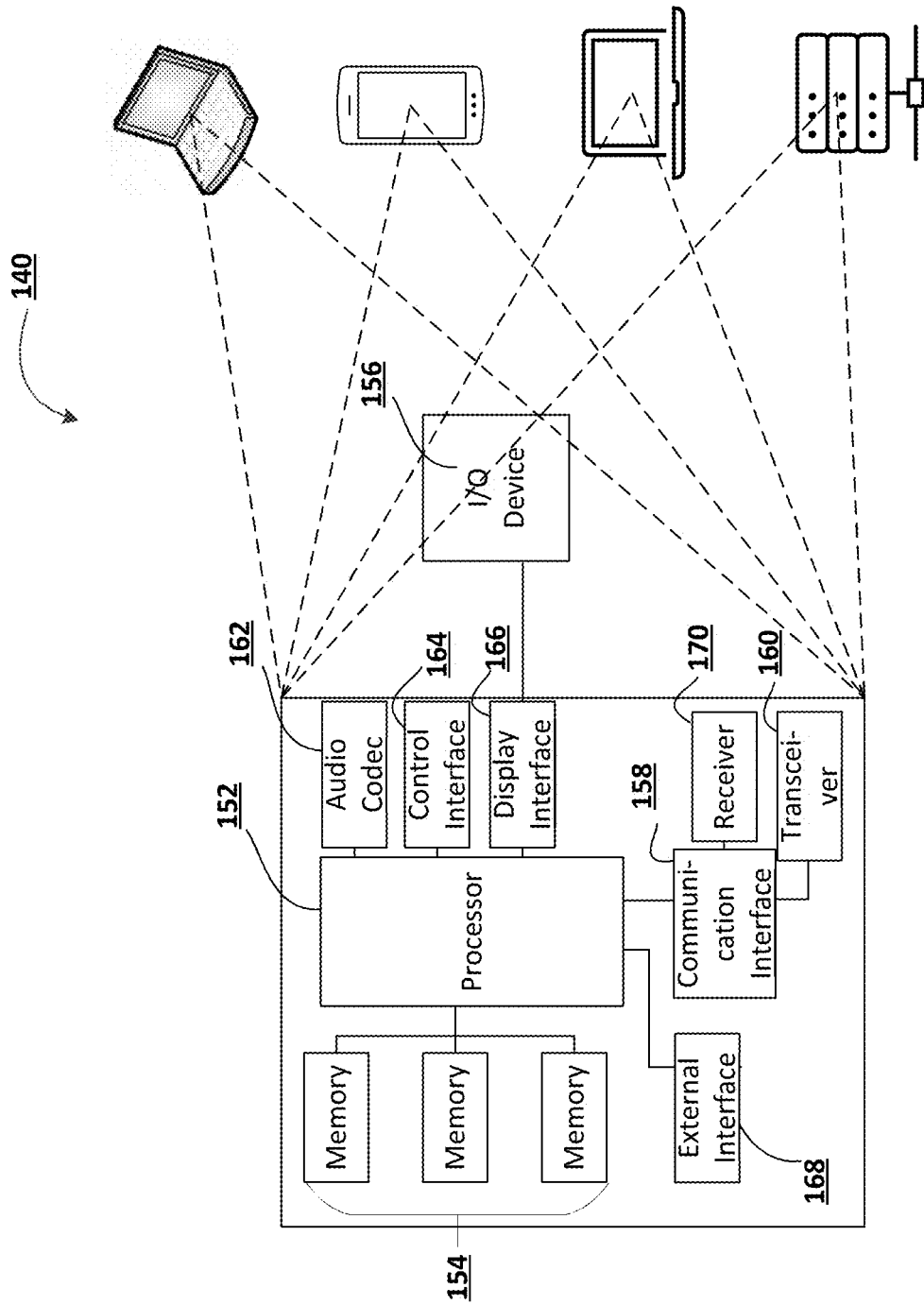
Figure 2:
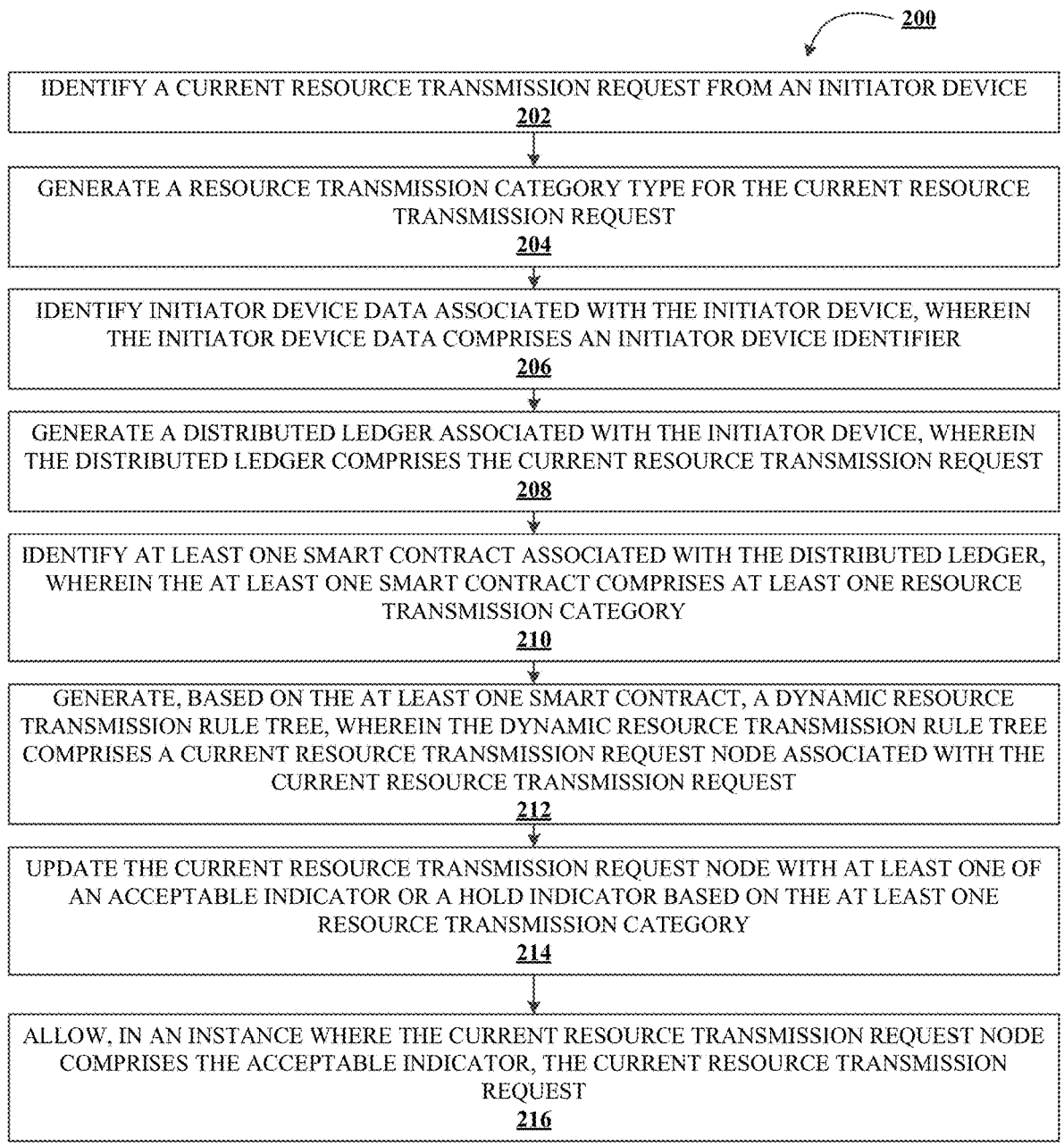
Figure 3:
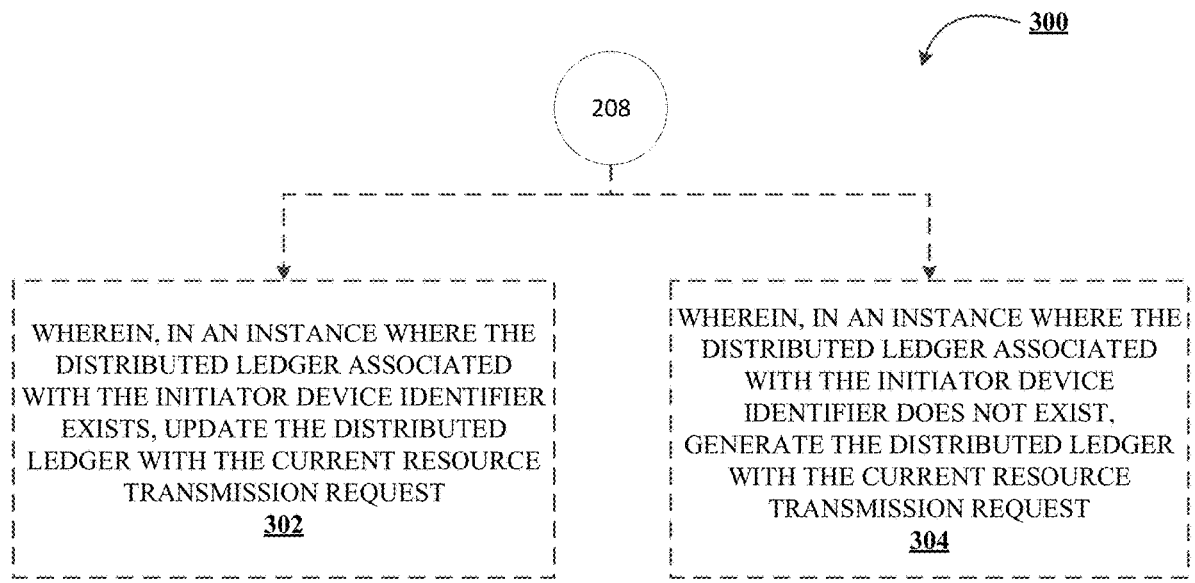
Figure 4:
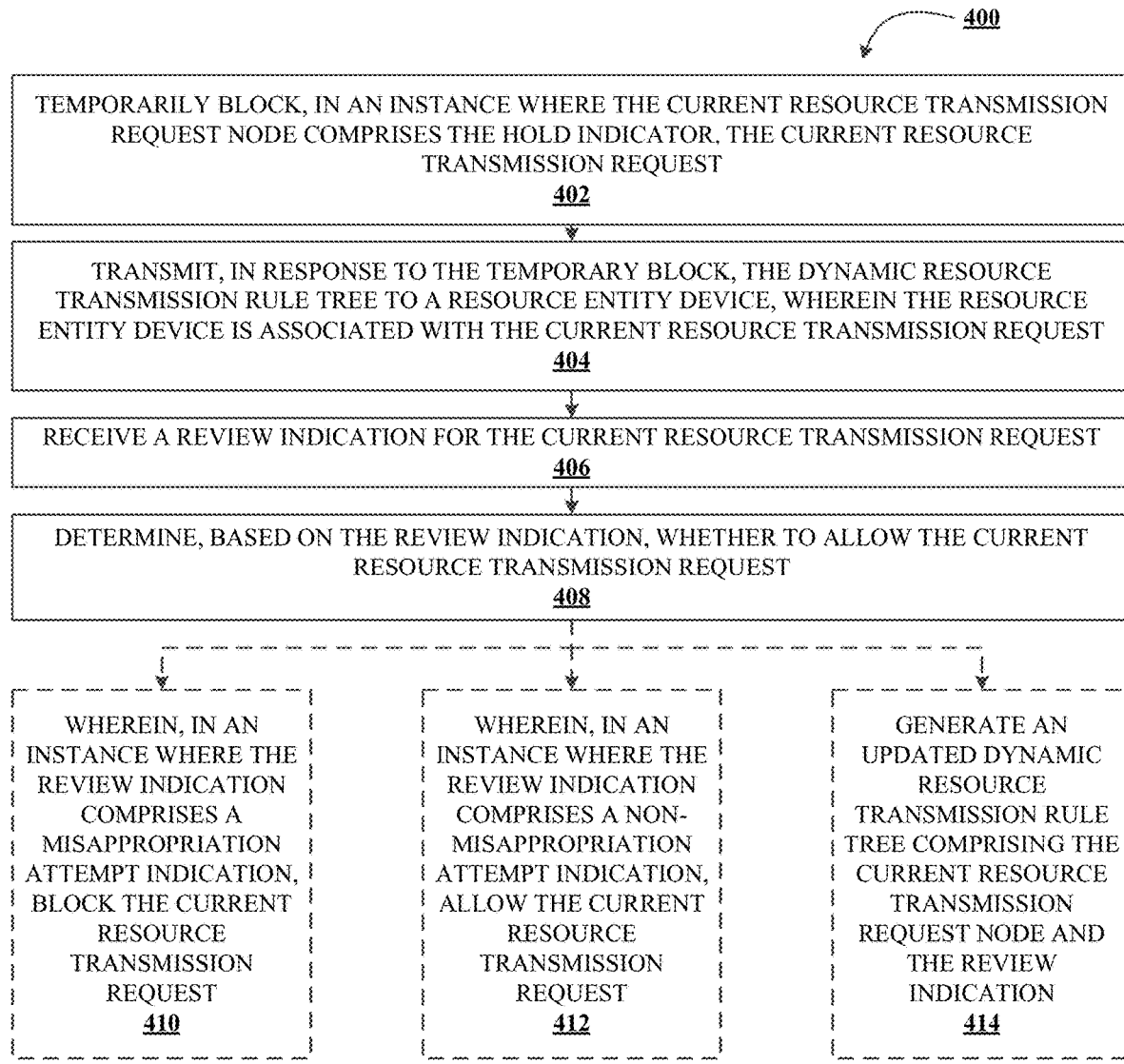
Figure 5:
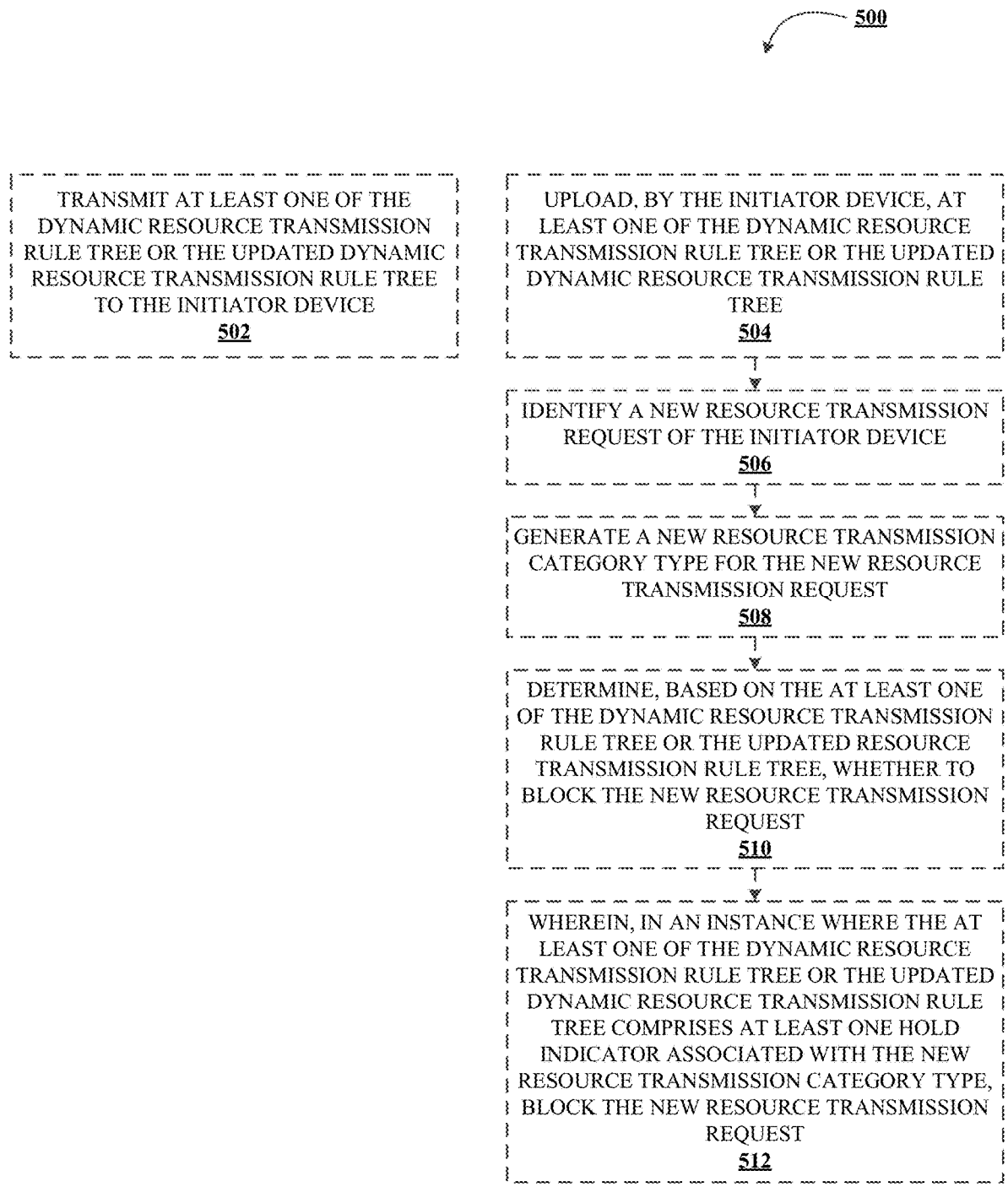
Figure 6:
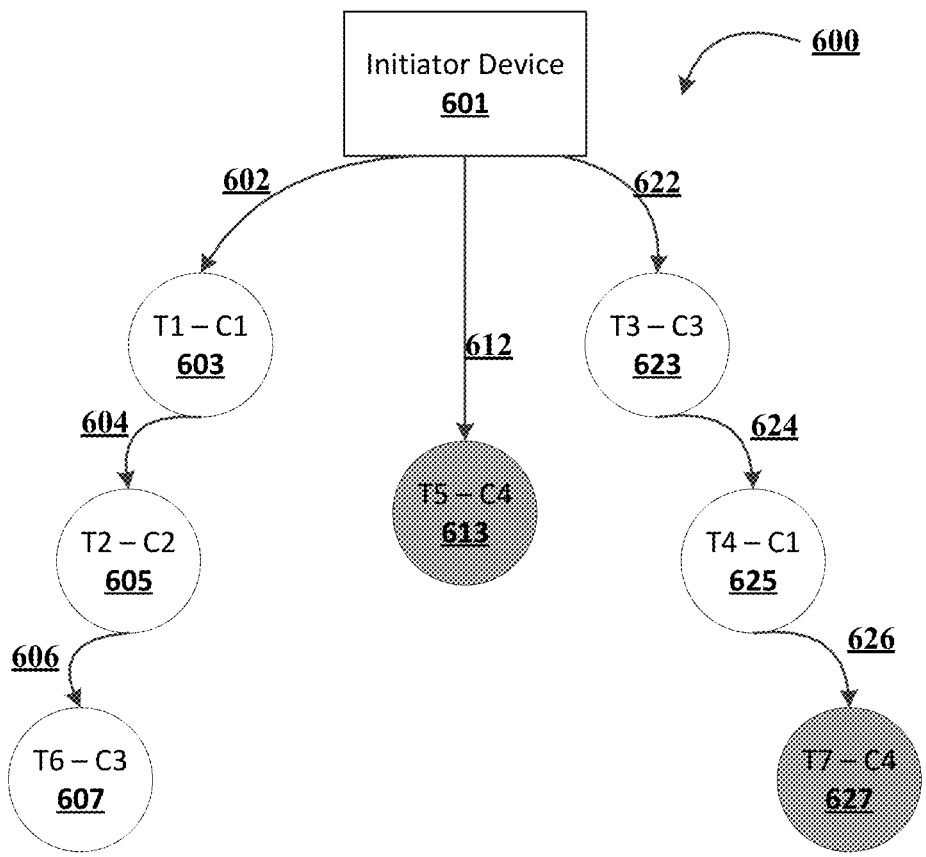

FIGS. 1A-1C illustrates technical components of an exemplary distributed computing environment for detecting and preventing misappropriation attempts based on initiator device data and dynamic rules in a distributed network, in accordance with an embodiment of the disclosure;

FIG. 2 illustrates a process flow for detecting and preventing misappropriation attempts based on initiator device data and dynamic rules in a distributed network, in accordance with an embodiment of the disclosure;

FIG. 3 illustrates a process flow for generating and/or updating the distributed ledger with the current resource transmission request, in accordance with an embodiment of the disclosure;

FIG. 4 illustrates a process flow for generating a review indication and generating an updated dynamic resource transmission rule tree, in accordance with an embodiment of the disclosure;

FIG. 5 illustrates a process flow for allowing and/or blocking a new resource transmission request, in accordance with an embodiment of the disclosure; and FIG. 6 illustrates and exemplary component diagram showing an exemplary dynamic resource transmission rule tree, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," "resource transmission," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As mentioned above, managers and users of an electronic network, including a distributed network, may have a harder time than ever determining when a newly used device is associated with previous misappropriation attempts. For instance, managers of electronic networks such as financial institution and resource institutions may have a difficult time determining whether a user device (i.e., an initiator device)

has previously been used at other institutions for misappropriation attempts. This is especially true when the security of data for these misappropriation attempts and non-misappropriation attempts need to be protected between entities and institutions, where the sharing of such previous misappropriation attempts could unduly burden users of the resources when their data is made public. Thus, there exists a need for misappropriation attempts for electronic resources to be determined in an efficient, accurate, and secure manner.

Accordingly, the initiator device detection system acts by identifying a current resource transmission request from an initiator device (a user device); generating a resource transmission category type for the current resource transmission request (e.g., a high value category type, a low value category type, a geolocation associated with previous misappropriation attempts, and/or the like); identifying initiator device data associated with the initiator device, wherein the initiator device data comprises an initiator device identifier; generating a distributed ledger (e.g., a blockchain) associated with the initiator device identifier, wherein the distributed ledger comprises the current resource transmission request. The initiator device detection system may further act by identifying at least one smart contract associated with the distributed ledger, wherein the at least one smart contract comprises at least one resource transmission category; generating, based on the at least one smart contract, a dynamic resource transmission rule tree, wherein the dynamic resource transmission rule tree comprises a current resource transmission request node associated with the current resource transmission request; updating the current resource transmission request node with at least one of an acceptable indicator or a hold indicator based on the at least one resource transmission category; and allowing, in an instance where the current resource transmission request node comprises the acceptable indicator, the current resource transmission request.

What is more, the present disclosure provides a technical solution to a technical problem. As described herein, the technical problem includes the accurate, efficient, and secure determination of misappropriation attempts from a device not previously identified within an entity's network. The technical solution presented herein allows for the accurate, efficient, and secure determination of misappropriation attempts through the use of a distributed network, a distributed ledger, and a dynamic resource transmission rule tree. In particular, the initiator device detection system is an improvement over existing solutions to the determination of misappropriation attempts for electronic resources, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for detecting and preventing misappropriation attempts based on initiator device data and dynamic rules in a distributed network 100, in accordance with an embodiment of the invention. As shown in FIG. 1A, the distributed computing environment 100 contemplated herein may include a system 130 (i.e., an initiator device detection system) an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for detecting and preventing misappropriation attempts based on initiator device data and dynamic rules in a distributed network, in accordance with an embodiment of the disclosure. In some embodiments, a system (e.g., similar to one or more of the systems described herein with respect to FIGS. 1A-1C) may perform one or more of the steps of process flow 200. For example, an initiator device detection system (e.g., the system 130 described herein with respect to FIG. 1A-1C) may perform the steps of process flow 200.

As shown in block 202, the process 200 may include the step of identifying a current resource transmission request from an initiator device. By way of non-limiting example, the initiator device detection system may identify a current resource transmission request by receiving a copy of the current resource transmission request from the initiator device, whereby the original current resource transmission request may be transmitted to a resource processing center such as a processing center controlled and operated by an entity or organization associated with a resource account (e.g., a financial institution, and/or the like).

In some embodiments, the initiator device detection system may identify the current resource transmission request by receiving the original current resource transmission request from the initiator device before the current resource transmission request is transmitted to a processing center. In this manner, the initiator device detection system may perform the processes herein described in identifying the initiator device and determining whether to allow the resource transmission request before the resource transmission request is transmitted to the processing center.

In some embodiments, the initiator device detection system may be comprised and/or stored on the initiator device, such that the initiator device detection system configures the initiator device and identifies each resource transmission request generated on the initiator device, in real time. In some embodiments, the initiator device detection system may be stored in an application associated with a client of the initiator device detection system (e.g., a financial institution's application) on the initiator device. In some embodiments, the initiator device detection system may be stored on the initiator device's hard drive, long term memory, and/or the like, such that the initiator device detection system may configure the initiator device to determine, itself, whether to allow the resource transmission request and/or whether to block the resource transmission request. Such an embodiment is disclosed in further detail below.

As used herein, the initiator device may refer to a user's user device which is used to generate a resource transmission request. As used herein, the initiator device may be associated with initiator device data, which may comprise an initiator device identifier such as an IMEI number, a serial number, a unique alphanumeric sequence, and/or the like, which may be used by the initiator device detection system to uniquely identify the initiator device.

As shown in block 204, the process flow 200 may include the step of generating a resource transmission category type for the current resource transmission request. In some embodiments, the initiator device detection system may generate a resource transmission category type for the current resource transmission request by parsing the data of the resource transmission request. For instance, the initiator device detection system may be configured—based on rules provided by a client of the initiator device detection system (such as a financial institution), rules provided by the manager of the initiator device detection system, and/or the like—to determine a specific category type for each resource transmission request, based on the data of the resource transmission request. By way of non-limiting example, a resource transmission request may comprise data regarding the amount of the resource transmission requested, an identified recipient of the resource transmission request, a geolocation of the resource transmission request generation (e.g., a geolocation of the initiator device at the time the resource transmission request is generated), a geolocation of the intended recipient (e.g., a geolocation of the user device associated with the intended recipient, an associated home address of the intended recipient, and/or the like), and/or the like.

Thus, and in some embodiments, the initiator device detection system may be configured to generate a resource transmission category based on at least one of the data of the resource transmission request. By way of non-limiting example, and where the resource transmission request comprises a high amount for the resource transmission request (e.g., a high value of resource that will be transmitted to a recipient account), the initiator device detection system may generate a high value resource transmission category type for the resource transmission request. Similarly, and where the resource transmission request comprises a low amount for the resource transmission request (e.g., a low value of resource that will be transmitted to a recipient account), the initiator device detection system may generate a low value resource transmission category type for the resource transmission request. Further, and where the resource transmission request comprises a particular geolocation for where the resource transmission request was generated (such as a geolocation comprising a country associated with many misappropriation attempts), the initiator device detection system may generate a resource transmission category type comprising a misappropriation geolocation resource generation category type.

In some embodiments, and where the resource transmission request comprising a recipient identifier of a recipient previously known to be associated with resource transmission requests, the initiator device detection system may generate a misappropriator recipient resource transmission category type for the resource transmission category type. As used herein, and as understood by a person of skill in the art, the initiator device detection system and its various resource transmission category types may be determined and/or generated based on each client of the initiator device detection system and their associated rules. In this manner, the initiator device detection system may be configurable to generate different resource transmission category types for each resource transmission request and is not limited to the examples provided herein.

As shown in block 206, the process flow 200 may include the step of identifying initiator device data associated with the initiator device, wherein the initiator device data comprises an initiator device identifier. In some embodiments, the initiator device detection system may identify an initiator device identifier based on the initiator device that generated the resource transmission request. As described above, the initiator device identifier may refer to a unique sequence of alphanumeric characters, which may be used by the initiator device detection system to identify each initiator device that generates a resource transmission request. Further, and as used herein, the initiator device identifier may be used within the initiator device detection system to identify the initiator device, across different entities and/or organizations, such as the entities and/or organizations associated with the resource transmission requests. In this manner, the initiator device identifier may be used by the initiator device detection system as a single identifier to uniquely identify each device used to submit resource transmission requests, across different entities and/or organizations.

As shown in block 208, the process flow 200 may include the step of generating a distributed ledger associated with the initiator device, wherein the distributed ledger comprises the current resource transmission request. In some embodiments, the initiator device detection system may generate a distributed ledger, such as a block chain, to track each of the resource transmissions (e.g., resource transmission requests, rejected resource transmission requests, allowed resource transmissions, and/or the like) associated with each initiator device. In some embodiments, and where the initiator device has never been used to generate a resource transmission request for any entities and/or organizations associated with the distributed ledger, the initiator device detection system may generate a new distributed ledger with the initiator device identifier and the current resource transmission request. Further, and in some embodiments, the distributed ledger may further comprise the resource transmission category type for the current resource transmission request. However, and where a distributed ledger has already been generated (i.e., already exists for the initiator device), the initiator device detection system may automatically update the previously generated distributed ledger with the most recently identified resource transmission request (e.g., the current resource transmission request). Such an embodiment is disclosed in further detail below with respect to FIGS. 3 and 5.

As shown in block 210, the process flow 200 may include the step of identifying at least one smart contract associated with the distributed ledger, wherein the at least one smart contract comprises at least one resource transmission category. In some embodiments, the initiator device detection system may further comprise a smart contract, which may be used in conjunction with the distributed ledger to determine whether a resource transmission request should be flagged as potentially comprising a misappropriation attempt. By way of non-limiting example, such a smart contract may comprise computer-executable code which may be stored on the distributed ledger to determine, when certain conditions are met on the distributed ledger, whether a resource transmission request should be flagged as potentially comprising a misappropriation attempt.

As used herein, the at least one smart contract may be agreed upon by at least one entity and/or organization associated with the resource transmission request(s) (e.g., at least one financial institution) and may identify at least one resource transmission category and associated action(s) when the at least one resource transmission category of the smart contract matches the resource transmission category type for the current resource transmission request. Thus, and in some embodiments, the at least one smart contract may comprise computer executable code that is configured to automatically generate—when a certain resource transmission category type is identified for the resource transmission request—a dynamic resource transmission rule tree comprising an indicator for the resource transmission request indicating whether to allow the resource transmission request and/or (temporarily) block the resource transmission request. In some embodiments, the smart contract may comprise a plurality of resource transmission categories and associated actions for each resource transmission category.

By way of non-limiting example, and where the resource transmission category type comprises a high value resource transmission category type, and where the at least one smart contract stored on the distributed ledger identifies the high value resource transmission category as being associated with a likely misappropriation, the initiator device detection system (based on the smart contract) may generate the dynamic resource transmission rule tree with the current resource transmission request, the initiator device identifier, and an indicator for the likely misappropriation attempt (e.g., a hold indicator). The generation of the dynamic resource transmission rule tree is discussed in further detail below.

As shown in block 212, the process flow 200 may include the step of generating—based on the at least one smart contract—a dynamic resource transmission rule tree, wherein the dynamic resource transmission rule tree comprises a current resource transmission request node associated with the current resource transmission request. By way of non-limiting example, the initiator device detection system may generate a dynamic resource transmission rule tree, where the dynamic resource transmission rule tree may comprise at least an initiator device node (e.g., based on the initiator device identifier), at least one resource transmission request node (such as a resource transmission request node associated with the current resource transmission request), and an indicator for the resource transmission request node. Such an indicator may be determined and/or generated by the initiator device detection system based on the resource transmission category type for the resource transmission request and the smart contract stored in the distributed ledger. In some embodiments, and where a distributed ledger has previously been generated for the initiator device (initiator device identifier), the initiator device detection system may update an already existing dynamic resource transmission rule tree with a resource transmission request node for the current resource transmission request and the associated indicator. Such a dynamic resource transmission blue tree is described in further detail below with respect to FIG. 6.

As shown in block 214, the process flow 200 may include the step of updating the current resource transmission request node with at least one of an acceptable indicator or a hold indicator based on the at least one resource transmission category. In some embodiments, the initiator device detection system may update a current resource transmission node with an indicator based on the smart contract (and the associate resource transmission category), the distributed ledger, the current resource transmission request, and the associated resource transmission category type.

By way of non-limiting example, and where the smart contract stored on the distributed ledger identifies a resource transmission category that matches the resource transmission category type of the current resource transmission request, and the resource transmission category is associated with a likely misappropriation attempt, the initiator device detection system may update the current resource transmission request node with a hold indicator.

As used herein, a hold indicator may refer to a visual representation and/or a computer-recognizable indication that the current resource transmission request should be put on hold for review. Thus, and in some embodiments, the hold indicator may comprise a highlighting of the current resource transmission request node, a flashing of the current resource transmission request node, a marker on the current resource transmission request node, a bolding of the current resource transmission request node, and/or the like, which may be used by the initiator device detection system to indicate the resource transmission request associated with the resource transmission request node was flagged as likely comprising a misappropriation attempt. In some embodiments, the hold indicator may comprise computer executable programming language which configures the processing device of the initiator device detection system to identify the resource transmission request associated with the resource transmission request node and transmit the resource transmission request data to a reviewing entity, such as a reviewing entity associated with a client of the initiator device detection system, a manager of the initiator device detection system, and/or the like.

In some embodiments, and upon a hold indicator being updated on the dynamic resource transmission rule tree may automatically cause the initiator device detection system to add the resource transmission request (e.g., the current resource transmission request) and its associated data to a queue for reviewing. In this manner, the initiator device detection system may track and automatically update a queue of data which may be transmitted for review to a reviewing entity's user device.

In some embodiments, the initiator device detection system may update the dynamic resource transmission rule tree and associated resource transmission request node (e.g., the current resource transmission request node) with an acceptable indicator based on the smart contract associated with the distributed ledger, the resource transmission request, and the resource transmission category type. For instance, and where the smart contract comprises a resource transmission category and associated action comprising an acceptable indicator, the initiator device detection system may determine whether the resource transmission category type for the current resource transmission request matches the resource transmission category for the acceptable indicator. By way of non-limiting example, and where the resource transmission category type comprises a low value resource transmission category type, and the smart contract comprises a resource transmission category of the same (e.g., the low value resource transmission category), and the low value resource transmission category of the smart contract is associated with an acceptable indicator (e.g., is likely not a misappropriation attempt), then the initiator device detection system may update the dynamic resource transmission rule tree with the acceptable indicator for the current resource transmission request node.

As shown in block 216, the process flow 200 may include the step of allowing, in an instance where the current resource transmission request node comprises the acceptable indicator, the current resource transmission request. In some embodiments, the initiator device detection system may allow, in an instance where the current resource transmission request node comprises an acceptable indicator, the current resource transmission request. For instance, such an acceptable indicator may be used by the initiator device detection system to determine that the current resource transmission request likely does not comprise a misappropriation attempt.

In some embodiments, and where the current resource transmission request node comprises a hold indicator, the initiator device detection system may transmit the data of the current resource transmission request to a reviewing entity's user device to determine whether to block the resource transmission request and/or allow the resource transmission request. Such an embodiment is disclosed in further detail below with respect to FIG. 4.

FIG. 3 illustrates a process flow 300 for generating and/or updating the distributed ledger with the current resource transmission request, in accordance with an embodiment of the disclosure. In some embodiments, a system (e.g., similar to one or more of the systems described herein with respect to FIGS. 1A-1C) may perform one or more of the steps of process flow 300. For example, an initiator device detection system (e.g., the system 130 described herein with respect to FIG. 1A-1C) may perform the steps of process flow 300. In some embodiments, and as shown in process flow 300, the processes described with respect to process flow 300 may follow the process described with respect to block 208 of FIG. 2.

In some embodiments, and as shown in block 302, the process flow 300 may include the step of updating, in an instance where the distributed ledger associated with the initiator device identifier exists, the distributed ledger with the current resource transmission request. In some embodiments, the initiator device detection system may determine whether a distributed ledger already exists for the initiator device identifier by accessing a distributed network environment comprising a plurality of distributed ledgers, where each distributed ledger may be associated with an initiator device identifier. Such a distributed environment may be updated and/or stored in a plurality of locations, such as a network of computing devices associated with a plurality of entities and/or organizations. Thus, and in some embodiments, each computing device in the network of computing devices may store a copy of the entire distributed ledger and may continually update the shared distributed ledger as new resource transmission requests are received for each initiator device, regardless of which organization or entity is associated with the resource for the resource transmission request (e.g., regardless of which financial institution is involved with the resource transmission request). Thus, and by way of non-limiting example, the initiator device detection system may update the distributed ledger and add a block comprising the current resource transmission request and may generate—based on this data and the at least one smart contract—a dynamic resource transmission rule tree.

In some embodiments, and as shown in block 304, the process flow 300 may include the step of generating, in an instance where the distributed ledger associated with the initiator device identifier does not exist, the distributed ledger with the current resource transmission request. In some embodiments, and where an initiator device has not previously been used for a resource transmission request for any of the entities and/or organizations, the initiator device detection system may generate a new distributed ledger comprising the initiator device identifier, the current resource transmission request, and/or the like. In some embodiments, the distributed ledger—once newly generated—may comprise the smart contract(s) associated with the entity for the resource transmission request (e.g., all the smart contracts listing the entity and/or organization as a party), may comprise the smart contract(s) associated with the initiator device detection system as a whole (e.g., all the smart contracts tracked by the initiator device detection system), and/or the like. Thus, and by way of non-limiting example, the initiator device detection system may generate the distributed ledger comprising the initiator device identifier, the current resource transmission request, at least one smart contract, and may generate—based on this data—a dynamic resource transmission rule tree.

In some embodiments, the initiator device detection system may generate—based on the at least one smart contract—the dynamic resource transmission rule tree, wherein the dynamic resource transmission rule tree comprises at least one previous resource transmission request node associated with the initiator device identifier, and where the at least one previous resource transmission request node comprises at least one of the acceptable indicator or the hold indicator. Thus, and by way of non-limiting example, the initiator device detection system may generate the dynamic resource transmission rule tree to comprise data regarding each of the resource transmissions (e.g., the resource transmission requests, the blocked resource transmission requests, the allowed resource transmission requests, and/or the like) that the initiator device has generated and/or transmitted, such that the dynamic resource transmission rule tree is a broad snapshot of all the resource transmissions associated with the initiator device.

Further, in some embodiments, each of the resource transmissions associated with the initiator device may be shown as a resource transmission request node on the dynamic resource transmission rule tree, and each of the resource transmission request nodes may comprise an indicator (e.g., a hold indicator, an acceptable indicator, and/or the like), such that the dynamic resource transmission rule tree is a broad snapshot of each of the resource transmission requests that were likely considered and/or determined to be misappropriation attempts and all the resource transmission requests that were considered not to be a misappropriation attempt. Such a dynamic resource transmission rule tree may further show each entity's and/or organization's associated resource transmissions as their own branch, such that while the dynamic resource transmission rule tree shows all the resource transmissions for all the organizations and/or entities, each organization and/or entity may have its own section on the dynamic resource transmission rule tree. A dynamic resource transmission rule tree, like the one described herein, is shown and described in an exemplary embodiment with respect to FIG. 6.

FIG. 4 illustrates a process flow 400 generating a review indication and generating an updated dynamic resource transmission rule tree, in accordance with an embodiment of the disclosure. In some embodiments, a system (e.g., similar to one or more of the systems described herein with respect to FIGS. 1A-1C) may perform one or more of the steps of process flow 400. For example, an initiator device detection system (e.g., the system 130 described herein with respect to FIG. 1A-1C) may perform the steps of process flow 400.

As shown in block 402, the process flow 400 may include the step of temporarily blocking, in an instance where the current resource transmission request node comprises the hold indicator, the current resource transmission request. In some embodiments, the initiator device detection system may temporarily block the current resource transmission request once a hold indicator is generated for the current resource transmission request node in the dynamic resource transmission rule tree.

In some embodiments, such a temporary block may comprise a pre-determined period, whereby the temporary block may transform into a permanent block once the pre-determined period has passed and/or the temporary block may be lifted once the pre-determined period has passed. In some embodiments, the pre-determined period may be determined by a client of the initiator device detection system, a manager of the initiator device detection system, the system itself, and/or the like.

As shown in block 404, the process flow 400 may include the step of transmitting—in response to the temporary block—the dynamic resource transmission rule tree to a resource entity device, wherein the resource entity device is associated with the current resource transmission request. In some embodiments, the initiator device detection system may transmit the dynamic resource transmission rule tree to a resource entity device, such as a resource entity device associated with a financial institution and/or organization. In some embodiments, the resource entity device may be a reviewing entity device, which may be configured to review the present the data of the current resource transmission request and accept a reviewer's input on whether to allow or disallow the current resource transmission request. In some embodiments, the resource entity device may be associated with the particular entity associated with the current resource transmission request, such as the financial institution which operates the resource account associated with the current resource transmission request.

As shown in block 406, the process flow 400 may include the step of receiving a review indicator for the current resource transmission request. In some embodiments, the initiator device detection system may receive a review indication for the current resource transmission request from the resource entity device, whereby the review indication may comprise an indication of whether the current resource transmission request comprises a misappropriation attempt or does not comprise a misappropriation attempt.

As shown in block 408, the process flow 400 may include the step of determining, based on the review indication, whether to allow the current resource transmission request. In some embodiments, the initiator device detection system may determine—based on the review indication—whether to allow the current resource transmission request based on the received review indication.

In some embodiments, and as shown in block 410, the process flow 400 may include the step of blocking—in an instance where the review indication comprises a misappropriation attempt indication—the current resource transmission request. In some embodiments, and where the review indication comprises a misappropriation attempt indication, the initiator device detection system may automatically and permanently block the current resource transmission request.

In some embodiments, and as shown in block 412, the process flow 400 may include the step of allowing—in an instance where the review indication comprises a non-misappropriation attempt indication—the current resource transmission request. In some embodiments, and where the review indication does not comprise a misappropriation attempt indication (e.g., the review indication comprises an indication that a misappropriation attempt has likely not occurred), the initiator device detection system may allow the current resource transmission request.

In some embodiments, and as shown in block 414, the process flow 400 may include the step of generating an updated dynamic resource transmission rule tree comprising the current resource transmission request and the review indication. In some embodiments, and based on the received review indication, the initiator device detection system may generate an updated dynamic resource transmission rule tree comprising the current resource transmission request node and the review indication, and the initiator device detection system may transmit and/or upload the updated dynamic resource transmission rule tree to the initiator device. Such an embodiment is described in further detail below with respect to FIG. 5.

FIG. 5 illustrates a process flow 500 for allowing and/or blocking a new resource transmission request, in accordance with an embodiment of the disclosure. In some embodiments, a system (e.g., similar to one or more of the systems described herein with respect to FIGS. 1A-1C) may perform one or more of the steps of process flow 500. For example, an initiator device detection system (e.g., the system 130 described herein with respect to FIG. 1A-1C) may perform the steps of process flow 500.

In some embodiments, and as shown in block 502, the process flow 500 may include the step of transmitting at least one of the dynamic resource transmission rule tree or the updated dynamic resource transmission rule tree to the initiator device. By way of non-limiting example, and where a dynamic resource transmission rule tree has already been generated for the initiator device, the initiator device detection system may transmit the updated version of the dynamic resource transmission rule tree (e.g., updated with the current resource transmission request node and associated indicator) to the initiator device, such that the initiator device may store the updated dynamic resource transmission rule tree for future reference when a new resource transmission request is generated. In some embodiments, and where a review has occurred because the current resource transmission request node comprised a hold indicator, the initiator device detection system may transmit the updated dynamic resource transmission rule tree with the review indication to the initiator device. In some embodiments, and where dynamic resource transmission rule tree was not previously generated, the initiator device detection system may transmit the newly generated dynamic resource transmission rule tree to the initiator device for storage, wherein the newly generated dynamic resource transmission rule tree may comprise the current resource transmission request node and the associated indicator.

In this manner, and by transmitting at least one of the newly generated dynamic resource transmission rule tree and/or the updated dynamic resource transmission rule tree, the initiator device may be configured to determine whether to allow a future resource transmission request. For instance, and where a future resource transmission request comprising a same and/or similar resource transmission request category type as a previous resource transmission request node that comprises a hold indicator, the initiator device may be configured to temporarily block the resource transmission request in a streamlined manner. Such a streamlined manner may additionally allow for less computing resources to be used, more secure data protection, and greater processing speeds.

In some embodiments, and as shown in block 504, the process flow 500 may include the step of uploading, by the initiator device, at least one of the dynamic resource transmission rule tree or the updated dynamic resource transmission rule tree. In some embodiments, the initiator device detection system (when stored on the initiator device) may upload the newly generated dynamic resource transmission rule tree and/or the updated dynamic resource transmission rule tree. For instance, and in the embodiments where the initiator device is included within the distributed network, the initiator device detection system may be configured on the initiator device, such that the initiator device is a node in the distributed network and such that the initiator device detection system may efficiently, securely, and accurately determine whether to allow future resource transmission requests.

In some embodiments, and as shown in block 506, the process flow 500 may include the step of identifying a new resource transmission request of the initiator device. In some embodiments, the initiator device detection system may identify a new resource transmission request (e.g., generated at a later time to the current resource transmission request discussed above) from the initiator device, whereby the new resource transmission request may comprise the same type(s) of data previously identified for the current resource transmission request, which may include but is not limited to an amount for the new resource transmission request, a recipient identifier for the new resource transmission request, a geolocation of the generation of the new resource transmission request, a geolocation of the recipient of the new resource transmission request, and/or the like. As discussed in detail above, and similar to the current resource transmission request, the initiator device detection system may be configured to generate a new resource transmission category type for the new resource transmission request, based on the data of the new resource transmission request.

In some embodiments, and as shown in block 508, the process flow 500 may include the step of generating a new resource transmission category type for the new resource transmission request. For instance, and similar to the current resource transmission request, the initiator device detection system may generate the new resource transmission category type for the new resource transmission request, whereby the new resource transmission category type may be based on at least one of the amount for the new resource transmission request, a recipient identifier for the new resource transmission request, the geolocation of the generation of the new resource transmission request, the geolocation of the recipient of the new resource transmission request, and/or the like. Additionally, and in some embodiments, the initiator device detection system (which may be stored on the initiator device) may determine—based on the new resource transmission category type—and based on the previously stored dynamic resource transmission rule tree, whether to allow and/or block the new resource transmission request.

In some embodiments, and as shown in block 510, the process flow 500 may include the step of determining, based on the at least one of the dynamic resource transmission rule tree or the updated resource transmission rule tree, whether to block the new resource transmission request. In some embodiments, the initiator device detection system may determine—locally and at the initiator device—whether to allow and/or block the new resource transmission request. For instance, and where the new resource transmission request category type matches a resource category type in the dynamic resource transmission rule tree, the initiator device detection system may generate an indicator to match the previous resource transmission request node that comprises the same resource category type. Thus, and where a previous resource transmission request node comprises a hold indicator and comprises the same category type as the new resource transmission category type, the initiator device detection system may also determine the new resource transmission request node should comprise the hold indicator. Similarly, and as understood by a person of skill in the art, where a previous resource transmission request node comprises a matching category type to the new resource transmission category type, and where the previous resource transmission request node comprises an allowance indicator, the initiator device detection system may determine the new resource transmission request node should comprise an allowance indicator.

Further, and based on the determined allowance and/or hold indicator, the initiator device detection system (stored on the initiator device) may allow and/or block the new resource transmission request, respectively.

In some embodiments, and as shown in block 512, the process flow 500 may include the step of blocking—in an instance where the at least one of the dynamic resource transmission rule tree or the updated dynamic resource transmission rule tree comprises at least one hold indicator associated with the new resource transmission category type—the new resource transmission request. For instance, and in the embodiment where the initiator device detection system has determined a hold indication for the new resource transmission request node because at least one previous resource transmission request node comprising the same category type comprises a hold indicator, the initiator device detection system may block the new resource transmission request.

However, and in some embodiments, such a block may comprise a temporary block on the resource transmission request. For instance, and in some embodiments, the initiator device detection system (e.g., stored partly on the initiator device) may be configured to transmit the data of the new resource transmission request to a reviewing entity device, such as a user device associated with a financial institution.

FIG. 6 illustrates an exemplary component diagram 600 showing an exemplary dynamic resource transmission rule tree, in accordance with an embodiment of the disclosure. In some embodiments, a system (e.g., similar to one or more of the systems described herein with respect to FIGS. 1A-1C) may perform one or more of the steps of process flows 200, 300, 400 and 500, to generate exemplary component diagram 600. For example, an initiator device detection system (e.g., the system 130 described herein with respect to FIG. 1A-1C) may perform the steps of process flows 200, 300, 400 and 500, to generate exemplary component diagram 600.

By way of non-limiting example, the component diagram 600 (which shows an exemplary dynamic resource transmission rule tree) may comprise a plurality of nodes, which may include but are not limited to an initiator device identifier node 601 (e.g., a root node), and a plurality of nodes connected by branches to indicate resource transmission requests for each entity and/or organization. For instance, branch 602 may indicate a first entity (such as a first financial institution) from which a first resource transmission request (T1-C1) 603 (comprising a first category type (C1)) is associated with; a second branch 604, comprising a second resource transmission request (T2-C2) 605 (comprising a second category type (C2); and a third branch 606, comprising a sixth resource transmission request (T6-C3) 607 (comprising a third category type (C3), may be shown in the dynamic resource transmission rule tree.

Similarly, and in some embodiments where a second entity is associated with the initiator device 601 (e.g., where the initiator device generates a new resource transmission request with a new entity and/or organization), a new branch—such as branch 612—may be generated, and the new branch may comprise a fifth resource transmission request (T5-C4) 613 (comprising a fourth category type). However, and in some embodiments where the category type of the resource transmission request node is associated with a hold indicator-based on the distributed ledger and the smart contract—the initiator device detection system may be configured to generate the hold indicator to be a visual indicator, such as the shaded portion of component 613.

In some embodiments, and where a third entity is associated with the initiator device 601, the initiator device detection system may be configured to generate a new branch (e.g., branch 622) for the dynamic resource transmission rule tree, whereby the new branch 622 may comprise a third resource transmission request (T3-C3) 623 (comprising a third category type); a fourth resource transmission request (T4-C1) 625 (comprising a first category type); and a seventh resource transmission request (T7-C4) 627 (comprising a fourth category type. Similar to the example provided above, and where the resource transmission request comprises a category type that has previously been identified as being associated with a hold indicator, the initiator device detection system may additionally generate a hold indicator for the seventh resource transmission request, which similarly comprises the fourth category type.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for detecting and preventing misappropriation attempts based on initiator device data and dynamic rules, the system comprising:
    a memory device with computer-readable program code stored thereon;
    at least one processing device operatively coupled to the at least one memory device and the at least one communication device, wherein executing the computer-readable code is configured to cause the at least one processing device to perform the following operations:
        identify a current resource transmission request from an initiator device;
    generate a resource transmission category type for the current resource transmission request;
    identify initiator device data associated with the initiator device, wherein the initiator device data comprises an initiator device identifier;
    generate a distributed ledger associated with the initiator device, wherein the distributed ledger comprises the current resource transmission request;
    identify at least one smart contract associated with the distributed ledger, wherein the at least one smart contract comprises at least one resource transmission category wherein the at least one smart contract is associated with at least one resource transmission entity, and wherein the at least one smart contract comprises a plurality of resource transmission categories;
    generate, based on the at least one smart contract, a dynamic resource transmission rule tree, wherein the dynamic resource transmission rule tree comprises a current resource transmission request node associated with the current resource transmission request;
    update the current resource transmission request node with at least one of an acceptable indicator or a hold indicator based on the at least one resource transmission category; and
    allow, in an instance where the current resource transmission request node comprises the acceptable indicator, the current resource transmission request.

2. The system of claim 1, wherein the generation of the distributed ledger associated with the initiator device identifier causes the at least one processing device to perform the following operation:
    wherein, in an instance where the distributed ledger associated with the initiator device identifier exists, update the distributed ledger with the current resource transmission request, or wherein, in an instance where the distributed ledger associated with the initiator device identifier does not exist, generate the distributed ledger with the current resource transmission request.

3. The system of claim 1, wherein executing the computer-readable code is configured to cause the at least one processing device to perform the following operation:
    temporarily block, in an instance where the current resource transmission request node comprises the hold indicator, the current resource transmission request.

4. The system of claim 3, wherein the computer-readable code is configured to cause the at least one processing device to perform the following operations:
    transmit, in response to the temporary block, the dynamic resource transmission rule tree to a resource entity device, wherein the resource entity device is associated with the current resource transmission request;

receive a review indication for the current resource transmission request; and determine, based on the review indication, whether to allow the current resource transmission request, wherein, in an instance where the review indication comprises a misappropriation attempt indication, block the current resource transmission request, or wherein, in an instance where the review indication comprises a non-misappropriation attempt indication, allow the current resource transmission request; and generate an updated dynamic resource transmission rule tree comprising the current resource transmission request node and the review indication.

5. The system of claim 3, wherein the temporary block comprises a pre-determined period.

6. The system of claim 1, wherein executing the computer-readable code is configured to cause the at least one processing device to perform the following operations:

generate, based on the at least one smart contract, the dynamic resource transmission rule tree, wherein the dynamic resource transmission rule tree comprises at least one previous resource transmission request node associated with the initiator device identifier, and wherein the at least one previous resource transmission request node comprises at least one of the acceptable indicator or the hold indicator.

7. The system of claim 3, wherein executing the computer-readable code is configured to cause the at least one processing device to perform the following operation:

transmit at least one of the dynamic resource transmission rule tree or the updated dynamic resource transmission rule tree to the initiator device.

8. The system of claim 3, wherein executing the computer-readable code is configured to cause the at least one processing device to perform the following operation:

upload, by the initiator device, at least one of the dynamic resource transmission rule tree or the updated dynamic resource transmission rule tree;

identify a new resource transmission request of the initiator device;

generate a new resource transmission category type for the new resource transmission request; and determine, based on the at least one of the dynamic resource transmission rule tree or the updated dynamic resource transmission rule tree, whether to block the new resource transmission request, wherein, in an instance where at least one of the dynamic resource transmission rule tree or the updated dynamic resource transmission rule tree comprises at least one hold indicator associated with the new resource transmission category type, block the new resource transmission request.

9. A computer program product for detecting and preventing misappropriation attempts based on initiator device data and dynamic rules, wherein the computer program product comprises at least one non-transitory computer-readable medium having computer-readable program code portions embodied therein, the computer-readable program code portions which when executed by a processing device are configured to cause the processor to perform the following operations:

identify a current resource transmission request from an initiator device;

generate a resource transmission category type for the current resource transmission request;

identify initiator device data associated with the initiator device, wherein the initiator device data comprises an initiator device identifier;

generate a distributed ledger associated with the initiator device, wherein the distributed ledger comprises the current resource transmission request;

identify at least one smart contract associated with the distributed ledger, wherein the at least one smart contract comprises at least one resource transmission category wherein the at least one smart contract is associated with at least one resource transmission entity, and wherein the at least one smart contract comprises a plurality of resource transmission categories;

generate, based on the at least one smart contract, a dynamic resource transmission rule tree, wherein the dynamic resource transmission rule tree comprises a current resource transmission request node associated with the current resource transmission request;

update the current resource transmission request node with at least one of an acceptable indicator or a hold indicator based on the at least one resource transmission category; and allow, in an instance where the current resource transmission request node comprises the acceptable indicator, the current resource transmission request.

10. The computer program product of claim 9, wherein the processing device is configured to cause the processor to perform the following operation:

temporarily block, in an instance where the current resource transmission request node comprises the hold indicator, the current resource transmission request.

11. The computer program product of claim 10, wherein the processing device is configured to cause the processor to perform the following operations:

transmit, in response to the temporary block, the dynamic resource transmission rule tree to a resource entity device, wherein the resource entity device is associated with the current resource transmission request;

receive a review indication for the current resource transmission request; and allow, based on the review indication, the current resource transmission request, wherein, in an instance where the review indication comprises a misappropriation attempt indication, block the current resource transmission request, or wherein, in an instance where the review indication comprises a non-misappropriation attempt indication, allow the current resource transmission request; and generate an updated dynamic resource transmission rule tree comprising the current resource transmission request node and the review indication.

12. The computer program product of claim 9, wherein the processing device is configured to cause the processor to perform the following operation:

generate, based on the at least one smart contract, the dynamic resource transmission rule tree, wherein the dynamic resource transmission rule tree comprises at least one previous resource transmission request node associated with the initiator device identifier, and wherein the at least one previous resource transmission request node comprises at least one of the acceptable indicator or the hold indicator.

13. The computer program product of claim 10, wherein the processing device is configured to cause the processor to perform the following operation:

transmit at least one of the dynamic resource transmission rule tree or the updated dynamic resource transmission rule tree to the initiator device.

14. The computer program product of claim 10, wherein the processing device is configured to cause the processor to perform the following operations:
   upload, by the initiator device, at least one of the dynamic resource transmission rule tree or the updated dynamic resource transmission rule tree;
   identify a new resource transmission request of the initiator device;
   generate a new resource transmission category type for the new resource transmission request; and
   determine, based on the at least one of the dynamic resource transmission rule tree or the updated dynamic resource transmission rule tree, whether to block the new resource transmission request, wherein, in an instance where at least one of the dynamic resource transmission rule tree or the updated dynamic resource transmission rule tree comprises at least one hold indicator associated with the new resource transmission category type, block the new resource transmission request.

15. A computer-implemented method for detecting and preventing misappropriation attempts based on initiator device data and dynamic rules, the computer implemented method comprising:
   identifying a current resource transmission request from an initiator device;
   generating a resource transmission category type for the current resource transmission request;
   identifying initiator device data associated with the initiator device, wherein the initiator device data comprises an initiator device identifier;
   generating a distributed ledger associated with the initiator device, wherein the distributed ledger comprises the current resource transmission request;
   identifying at least one smart contract associated with the distributed ledger, wherein the at least one smart contract comprises at least one resource transmission category wherein the at least one smart contract is associated with at least one resource transmission entity, and wherein the at least one smart contract comprises a plurality of resource transmission categories;
   generating, based on the at least one smart contract, a dynamic resource transmission rule tree, wherein the dynamic resource transmission rule tree comprises a current resource transmission request node associated with the current resource transmission request;
   updating the current resource transmission request node with at least one of an acceptable indicator or a hold indicator based on the at least one resource transmission category; and
   allowing, in an instance where the current resource transmission request node comprises the acceptable indicator, the current resource transmission request.

16. The computer-implemented method of claim 15, further comprising:
   temporarily blocking, in an instance where the current resource transmission request node comprises the hold indicator, the current resource transmission request.

17. The computer-implemented method of claim 15, further comprising:
   transmitting, in response to the temporary block, the dynamic resource transmission rule tree to a resource entity device, wherein the resource entity device is associated with the current resource transmission request;
   receiving a review indication for the current resource transmission request; and
   allowing, based on the review indication, the current resource transmission request,
   wherein, in an instance where the review indication comprises a misappropriation attempt indication, blocking the current resource transmission request, or
   wherein, in an instance where the review indication comprises a non-misappropriation attempt indication, allowing the current resource transmission request; and
   generating an updated dynamic resource transmission rule tree comprising the current resource transmission request node and the review indication.

18. The computer-implemented method of claim 15, further comprising:
   generating, based on the at least one smart contract, the dynamic resource transmission rule tree,
   wherein the dynamic resource transmission rule tree comprises at least one previous resource transmission request node associated with the initiator device identifier, and wherein the at least one previous resource transmission request node comprises at least one of the acceptable indicator or the hold indicator.

19. The computer-implemented method of claim 16, further comprising:
   transmitting at least one of the dynamic resource transmission rule tree or the updated dynamic resource transmission rule tree to the initiator device.

* * * * *